United States Patent
Shin et al.

(10) Patent No.: US 11,347,634 B2
(45) Date of Patent: May 31, 2022

(54) MEMORY SYSTEM PERFORMING WRITE-SAME OPERATION AND OPERATING METHOD THEREOF

(71) Applicant: SK hynix Inc., Gyeonggi-do (KR)

(72) Inventors: Soong Sun Shin, Gyeonggi-do (KR); Yong Tae Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/984,910

(22) Filed: Aug. 4, 2020

(65) Prior Publication Data

US 2021/0303456 A1 Sep. 30, 2021

(30) Foreign Application Priority Data

Mar. 31, 2020 (KR) .................. 10-2020-0038770

(51) Int. Cl.
*G06F 12/02* (2006.01)
*G06F 12/14* (2006.01)
*G06F 12/0831* (2016.01)
*G06F 12/06* (2006.01)

(52) U.S. Cl.
CPC ...... *G06F 12/0238* (2013.01); *G06F 12/0646* (2013.01); *G06F 12/0833* (2013.01); *G06F 12/1408* (2013.01)

(58) Field of Classification Search
None
See application file for complete search history.

(56) References Cited

U.S. PATENT DOCUMENTS

| | | | |
|---|---|---|---|
| 8,694,563 B1* | 4/2014 | Cameron | G06F 16/1727 707/822 |
| 9,898,205 B1* | 2/2018 | Kaliannan | G06F 3/067 |
| 2013/0067273 A1* | 3/2013 | Fiske | G06F 11/1048 714/6.12 |
| 2015/0074358 A1* | 3/2015 | Flinsbaugh | G06F 3/0679 711/155 |
| 2015/0286524 A1* | 10/2015 | Trantham | G06F 11/108 714/766 |
| 2016/0070652 A1* | 3/2016 | Sundararaman | G06F 3/065 711/154 |
| 2017/0220296 A1* | 8/2017 | Kim | G06F 3/064 |

FOREIGN PATENT DOCUMENTS

| | | |
|---|---|---|
| KR | 10-1453707 | 10/2014 |
| KR | 10-1478168 | 12/2014 |
| KR | 10-1824067 | 1/2018 |

* cited by examiner

Primary Examiner — Tracy C Chan
(74) Attorney, Agent, or Firm — IP & T Group LLP

(57) ABSTRACT

A memory system includes a nonvolatile memory apparatus, and a write-same manager configured to perform a write-same operation on the nonvolatile memory apparatus, wherein the write-same manager merges a first write-same operation and a second write-same operation by comparing first operation information of the first write-same operation and second operation information of the second write-same operation.

16 Claims, 12 Drawing Sheets

MEMORY SYSTEM PERFORMING WRITE-SAME OPERATION AND OPERATING METHOD THEREOF

CROSS-REFERENCES TO RELATED APPLICATION

The present application claims priority under 35 U.S.C. § 119(a) to Korean application number 10-2020-0038770, filed on Mar. 31, 2020, in the Korean Intellectual Property Office, which is incorporated herein by reference in its entirety.

BACKGROUND

1. Technical Field

Various embodiments generally relate to a memory system, and more particularly, to a memory system including a nonvolatile memory apparatus.

2. Related Art

A memory system may be configured to store data provided by a host apparatus in response to a write request from the host apparatus. Furthermore, the memory system may be configured to provide stored data to the host apparatus in response to a read request from the host apparatus. The host apparatus is an electronic device capable of processing data, and may include a computer, a digital camera or a mobile phone. The memory system may be embedded in the host apparatus to operate or may be fabricated in a separable form and connected to the host apparatus to operate.

SUMMARY

Embodiments of the present disclosure provide a memory system capable of efficiently performing a write-same operation and an operating method thereof.

In an embodiment, a memory system may include a nonvolatile memory apparatus; and a write-same manager configured to perform a write-same operation on the nonvolatile memory apparatus. The write-same manager may merge a first write-same operation and a second write-same operation by comparing first operation information of the first write-same operation and second operation information of the second write-same operation.

In an embodiment, an operating method of a memory system may include comparing first operation information of a first write-same operation and second operation information of a second write-same operation; and determining whether to merge the first write-same operation and the second write-same operation based on a result of the comparison.

In an embodiment, a memory system may include a nonvolatile memory apparatus; a write-same manager configured to perform a write-same operation on the nonvolatile memory apparatus; and an encryption unit configured to encrypt repetitive patterns respectively corresponding to continuous logical addresses into encrypted patterns at a time when the write-same operation is performed.

In an embodiment, an operating method of a controller may include receiving pattern data together with a first sequence for a single write-same operation and the pattern data together with a second sequence for another single write-same operation, each of the first and second sequences being of continuous logical addresses; encrypting the pattern data; and controlling a memory device to perform a single write-same operation of storing the encrypted data into a storage region corresponding to each logical address merged within the first and second sequences when all the logical addresses in both the first and second sequences are continuous.

DETAILED DESCRIPTION

Figure 1:
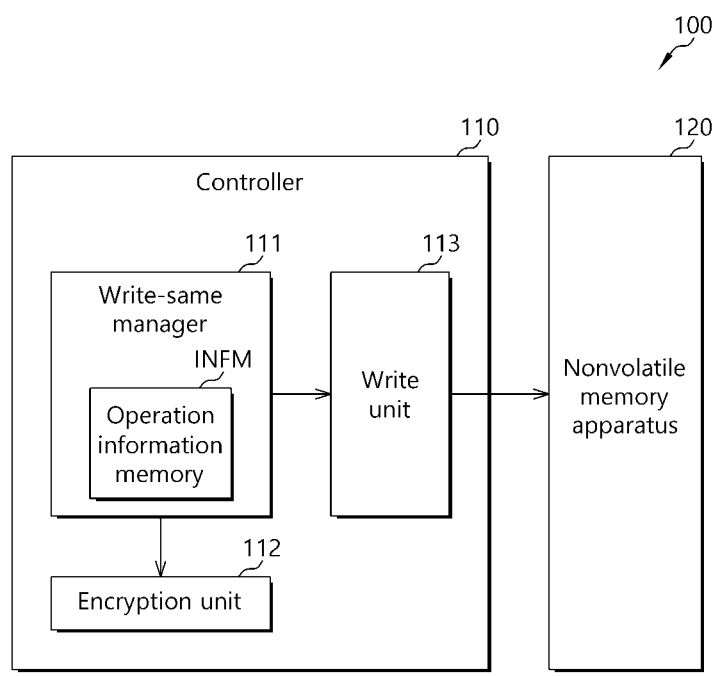
FIG. 1 is a block diagram illustrating a memory system according to an embodiment of the present disclosure.

Advantages and characteristics of this disclosure and methods of achieving them will be described through embodiments to be described later in detail along with the accompanying drawings. However, this disclosure is not limited to the embodiments described herein, and may be materialized in other forms. The present embodiments are provided to describe this disclosure in detail to the extent that a person having ordinary skill in the art to which the present disclosure pertains may readily carry out the technical spirit of this disclosure.

In the drawings, embodiments of the present disclosure are not limited to specific forms illustrated in the drawings and have been exaggerated for clarity. Specific terms have been used in the specification, but the terms are used to only describe the present disclosure, not to limit the meaning of the terms or the scope of right of the present disclosure written in the claims.

In the specification, an expression "and/or" is used as meaning including at least one of the elements listed front and back. Furthermore, an expression "connected/coupled"

is used as meaning including one element is directly connected to another element and that the two elements are indirectly connected through a another element. In the specification, the singular form includes the plural form unless specially described otherwise. Furthermore, terms, such as "includes or comprises" and/or "including or comprising" used in the specification, mean the existence or addition of one or more other elements, steps, operations and/or devices, in addition to the described elements, steps, operations and/or devices.

As used in the present disclosure, the terms 'circuit', 'unit', 'component', 'module' and the like refer to hardware or a combination of hardware and software/firmware. More specifically, any such term can refer to any or all of the following: (a) hardware-only circuit implementations including integrated circuit(s) (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and/or (c) to circuits, such as a microprocessor(s) or a portion of a microprocessor(s), that require software or firmware for operation, even if the software or firmware is not physically present. As a further example, as used in this application, any of the above terms may also cover an implementation of merely a processor (or multiple processors) or portion of a processor and its (or their) accompanying software and/or firmware.

Hereinafter, embodiments are described in detail with reference to the accompanying drawings.

FIG. 1 is a block diagram illustrating a memory system 100 according to an embodiment of the present disclosure.

The memory system 100 may be configured to store data, for example, data provided by an external host apparatus in response to a write request from the host apparatus. Furthermore, the memory system 100 may be configured to provide stored data, for example, to the host apparatus in response to a read request from the host apparatus.

The memory system 100 may be configured as, but not limited to, a personal computer memory card international association (PCMCIA) card, a compact flash (CF) card, a smart media card, a memory stick, various multimedia cards (e.g., MMC, eMMC, RS-MMC, and MMC-micro), secure digital (SD) cards (e.g., SD, Mini-SD and Micro-SD), a universal flash storage (UFS) or a solid state drive (SSD).

The memory system 100 may include a controller 110 and a nonvolatile memory apparatus 120.

The controller 110 may control an overall operation of the memory system 100. The controller 110 may control the nonvolatile memory apparatus 120 in order to perform various operations, for example, a foreground operation in response to an instruction from the host apparatus. The foreground operation may include operations of writing data in the nonvolatile memory apparatus 120 and reading data from the nonvolatile memory apparatus 120, in response to instructions from the host apparatus, that is, a write request and a read request.

Furthermore, the controller 110 may control the nonvolatile memory apparatus 120 in order to perform an internally necessary background operation independently of the host apparatus. The background operation may include a wear-leveling operation, a garbage collection operation, an erase operation, a read re-claim operation, and a refresh operation for the nonvolatile memory apparatus 120. Like the foreground operation, the background operation may include operations of writing data in the nonvolatile memory apparatus 120 and reading data from the nonvolatile memory apparatus 120.

The controller 110 may perform a write-same operation. For example, the controller 110 may perform a write-same operation in response to a write-same command transmitted by the host apparatus. The write-same command may be a command by which the host apparatus instructs the controller 110 to repeatedly store a specific pattern for continuous logical addresses. The pattern may be a unit of data corresponding to a single logical address. The pattern may be generated, by the controller 110, from pattern data provided along with the write-same command, as described later.

The controller 110 may include a write-same manager 111, an encryption unit 112, and a write unit 113.

The write-same manager 111 may generate operation information in response to a write-same command. The operation information may include pattern data on which a write-same operation will be performed and information on continuous logical addresses. For example, the operation information may include pattern data, the start logical address of continuous logical addresses, and the number of continuous logical addresses.

The write-same manager 111 may include an operation information memory INFM in which operation information is stored. The operation information memory INFM may store operation information of one or more write-same operations that have not yet been performed. The operation information memory INFM may be managed in a queue structure form.

The write-same manager 111 may compare first operation information of a first write-same operation and second operation information of a second write-same operation with reference to the operation information memory INFM, and may merge the first write-same operation and the second write-same operation.

In some embodiments, when the pattern data of first operation information and the pattern data of second operation information are identical and all logical addresses in both the first operation information and the second operation information are continuous, the write-same manager 111 may merge a first write-same operation and a second write-same operation. In some embodiments, the write-same manager 111 may merge two or more write-same operations when the pattern data of each of the operation information of the write-same operations are identical and all logical addresses of the operation information of the write-same operations are continuous. In contrast, when the pattern data of first operation information and the pattern data of second operation information are not the same or all logical addresses in both the first operation information and the second operation information are not continuous, the write-same manager 111 may determine not to merge a first write-same operation and a second write-same operation.

The write-same manager 111 may generate updated operation information when merging a first write-same operation and a second write-same operation. The write-same manager 111 may update, with the updated operation information, preceding information of first operation information of the first write-same operation and second operation information of the second write-same operation in the operation information memory INFM, and may remove subsequent information of the first operation information and the second operation information from the operation information memory INFM.

In some embodiments, after storing operation information in the operation information memory INFM in response to a write-same command, the write-same manager 111 may transmit, to the host apparatus, a response to the write-same command although a corresponding write-same operation has not yet been completed.

The write-same manager 111 may control the encryption unit 112 and the write unit 113 in order to perform a write-same operation.

The encryption unit 112 may encrypt a pattern corresponding to a logical address based on the corresponding logical address, and may generate an encrypted pattern. The encrypted pattern may include error check data such as parity data and CRC.

In an embodiment, the encryption unit 112 may encrypt, into encrypted patterns, repetitive patterns respectively corresponding to continuous logical addresses at a time based on the corresponding logical addresses.

The encryption unit 112 may include an advanced encryption standard (AES) engine, for example.

The write unit 113 may store, in the nonvolatile memory apparatus 120, patterns encrypted by the encryption unit 112.

In some embodiments, the write-same manager 111 may control an encryption operation of the encryption unit 112 and a write operation of the write unit 113 to be performed in parallel. Specifically, the write-same manager 111 may control the encryption unit 112 to generate subsequently encrypted patterns while the write unit 113 stores an encrypted pattern in the nonvolatile memory apparatus 120.

The nonvolatile memory apparatus 120 may store data transmitted by the controller 110, and may read data stored therein and transmit the read data to the controller 110, under the control of the controller 110.

The nonvolatile memory apparatus 120 may include, but not limited to, a flash memory apparatus such as a NAND flash or a NOR flash, a ferroelectric random access memory (FeRAM), a phase-change random access memory (PCRAM), a magnetic random access memory (MRAM) or a resistive random access memory (ReRAM).

The nonvolatile memory apparatus 120 may include one or more planes, one or more memory chips, one or more memory dies or one or more memory packages.

Figure 2:
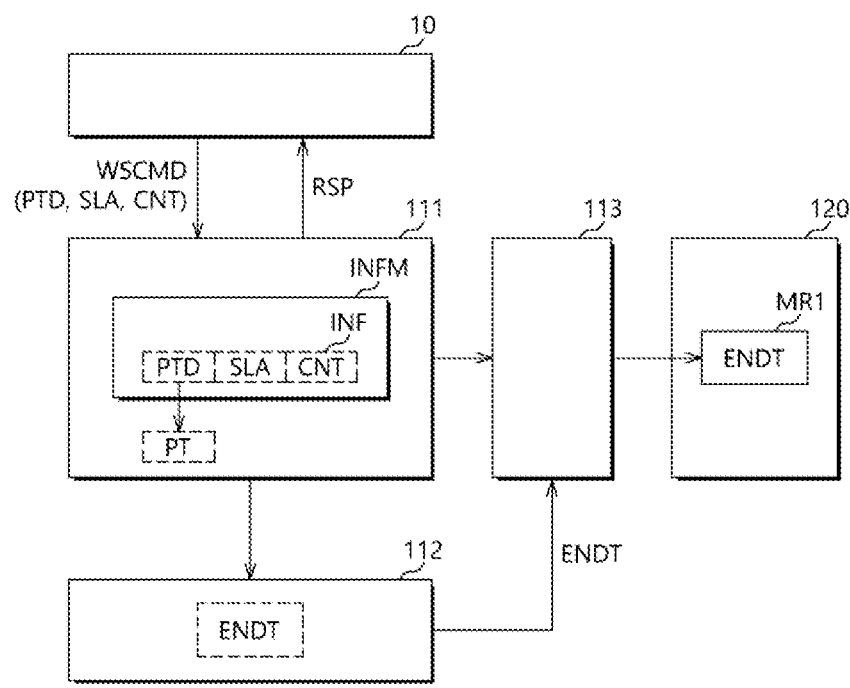
FIG. 2 is a diagram illustrating a method of performing a write-same operation according to an embodiment of the present disclosure.

FIG. 2 is a diagram illustrating a method of performing a write-same operation according to an embodiment.

Referring to FIG. 2, the controller 110 may receive a write-same command WSCMD from a host apparatus 10. The write-same command WSCMD may include pattern data PTD, a start logical address SLA, and a count CNT of continuous logical addresses starting from the start logical address SLA.

The write-same manager 111 may store operation information INF in the operation information memory INFM in response to the write-same command WSCMD. The operation information INF may include the pattern data PTD, the start logical address SLA, and the count CNT. After storing the operation information INF in the operation information memory INFM, the write-same manager 111 may immediately transmit a response RSP to the host apparatus 10 although a write-same operation has not yet been completed. The host apparatus 10 may determine that the write-same operation has been completed, based on the response RSP transmitted by the write-same manager 111. That is, the response speed of a write-same operation for the host apparatus 10 can be improved by transmitting a fast response RSP to the host apparatus 10 when the reliability of the write-same operation is guaranteed.

The operation information INF stored in the operation information memory INFM can be protected although sudden power-off occurs. For example, when sudden power-off occurs, the write-same manager 111 may move, to the nonvolatile memory apparatus 120, the operation information INF, stored in the operation information memory INFM, using reserved power. For another example, the operation information memory INFM may be configured as a nonvolatile memory.

The write-same manager 111 may perform a write-same operation corresponding to the operation information INF immediately after storing the operation information INF. Alternatively, the write-same manager 111 may perform the write-same operation as a background operation in an idle time. Alternatively, the write-same manager 111 may perform the write-same operation based on various conditions, such as a wait time and the count of the operation information INF stored in the operation information memory INFM.

The write-same manager 111 may control the encryption unit 112 and the write unit 113 in order to perform the write-same operation based on the operation information INF. Specifically, the write-same manager 111 may generate a pattern PT having a given size based on the pattern data PTD. The given size of the pattern PT may be 512 bytes, for example. For example, the given size may be the size of data corresponding to a single logical address recognized by the host apparatus 10. When the pattern data PTD having the given size is transmitted, the write-same manager 111 may immediately use the pattern data PTD as the pattern PT. When the pattern data PTD is smaller than the given size, the write-same manager 111 may generate a pattern PT having the given size by overlapping the pattern data PTD.

The write-same manager 111 may control the encryption unit 112 to generate encrypted data ENDT based on the pattern PT and continuous logical addresses corresponding to the count CNT and starting from the start logical address SLA.

Furthermore, the write-same manager 111 may control the write unit 113 to store the encrypted data ENDT in a memory region MR1 of the nonvolatile memory apparatus 120. The physical address of the memory region MR1 may be mapped onto the continuous logical addresses corresponding to the count CNT and starting from the start logical address SLA. When the storage of the encrypted data ENDT in the memory region MR1 is completed, the write-same operation may be terminated.

The write-same manager 111 may control the encryption unit 112 and the write unit 113 to operate in parallel. Specifically, while the write unit 113 stores the encrypted data ENDT in the nonvolatile memory apparatus 120, the write-same manager 111 may control the encryption unit 112 to generate subsequently encrypted data ENDT. That is, the write-same manager 111 may asynchronously control the encryption unit 112 and the write unit 113, thus further improving performance of a write-same operation.

In some embodiments, the write-same manager 111 may store the pattern PT instead of the pattern data PTD as the operation information INF.

Figure 3:
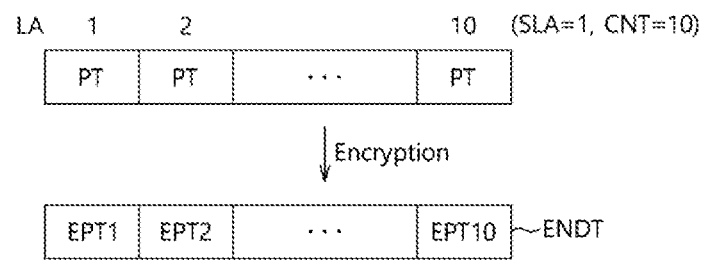
FIG. 3 is a diagram illustrating an encryption operation of an encryption unit according to an embodiment of the present disclosure.

FIG. 3 is a diagram illustrating an encryption operation of the encryption unit 112 according to an embodiment.

Referring to FIG. 3, the encryption unit 112 may generate encrypted data ENDT by performing an encryption operation on repetitive patterns PT.

In order to generate the encrypted data ENDT, the encryption unit 112 may receive patterns PT, a start logical address SLA and a count CNT from the write-same manager 111. The count CNT may be the number of patterns PT that need to overlap. In other words, the count CNT may be the number of continuous logical addresses LA starting from the start logical address SLA.

According to an embodiment, when receiving a start logical address SLA "1" and a count CNT "10", the write-same manager 111 may determine continuous logical addresses LA from "1" to "10." The logical addresses LA may correspond to repetitive patterns PT, respectively.

In some embodiments, the encryption unit 112 may receive patterns PT and continuous logical addresses LA from the write-same manager 111.

The encryption unit 112 may generate encrypted patterns EPT1 to EPT10 as the result of encrypting the repetitive patterns PT using the logical addresses LA. The encryption unit 112 may encrypt the patterns PT using the respective corresponding logical addresses LA. For example, the encryption unit 112 may generate the encrypted pattern EPT1 by encrypting a pattern PT using the start logical address SLA "1." In this case, if the patterns PT have different logical addresses LA in spite of being the same patterns PT, the encryption unit 112 may generate different encrypted patterns. That is, the encrypted patterns EPT1 to EPT10 may have different values.

Each of the encrypted patterns EPT1 to EPT10 may include error check data such as parity data and CRC.

The encryption unit 112 may show better performance when encrypting data at a time compared to when dividing data having a large size and encrypting the divided data several times. Specifically, a method of continuously performing an encryption operation on continuous logical addresses and outputting encrypted patterns together may show better performance than a method of performing an encryption operation on one logical address, outputting the encrypted pattern, performing an encryption operation on a next logical address, and then outputting an encrypted pattern.

The encryption unit 112 may perform an encryption operation only on continuous logical addresses at a time in terms of its hardware characteristics.

In some embodiments, the encryption unit 112 may perform an encryption operation on logical addresses up to a given maximum count at a time. Accordingly, if a write-same operation is performed on a greater number of continuous logical addresses than the given maximum count, the encryption unit 112 may repeat the encryption operation on the maximum counts of the continuous logical addresses.

Accordingly, as will be described later, the write-same manager 111 can more efficiently perform write-same operations by merging the different write-same operations using the characteristics of the encryption unit 112.

Figure 4A:
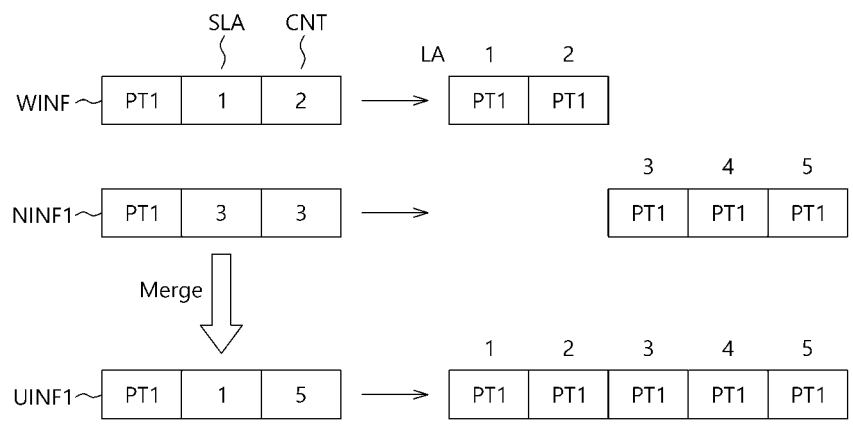
FIGS. 4A to 4C are diagrams illustrating methods of merging, by a write-same manager, write-same operations according to an embodiment of the present disclosure.
Figure 4B:
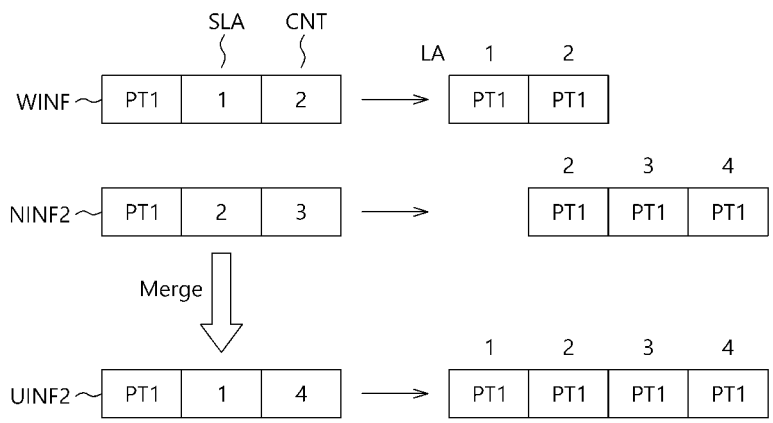
Figure 4C:
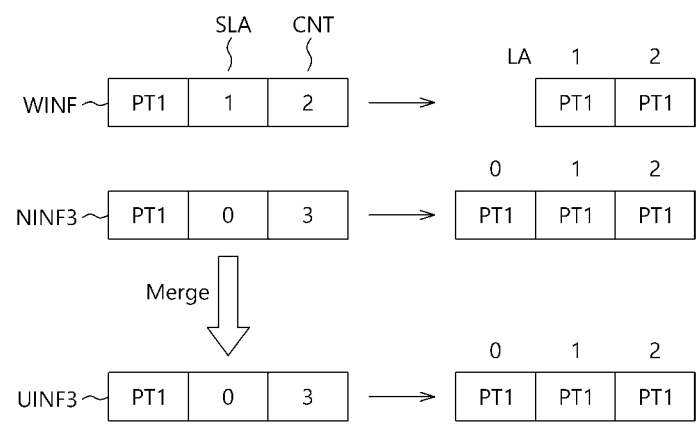

FIGS. 4A to 4C are diagrams illustrating methods of merging, by the write-same manager 111, write-same operations according to an embodiment. FIGS. 4A to 4C illustrate examples in which pieces of subsequent operation information NINF1 to NINF3 different from one another are each merged with respect to the same preceding operation information WINF.

Referring to FIG. 4A, the preceding operation information WINF may be previously stored in the operation information memory INFM and may be for a write-same operation (hereinafter referred to as a "preceding write-same operation") that is not yet performed.

The write-same manager 111 may store the subsequent operation information NINF1 for a subsequent write-same operation in the operation information memory INFM in response to a write-same command. The write-same manager 111 may determine whether to merge the subsequent write-same operation with the preceding write-same operation by comparing the subsequent operation information NINF1 and the preceding operation information WINF.

Specifically, the preceding operation information WINF may include a pattern PT1, a start logical address SLA "1" and a count CNT "2." Accordingly, the preceding operation information WINF may be for logical addresses LA "1" and "2."

The subsequent operation information NINF1 may include a pattern PT1, a start logical address SLA "3" and a count CNT "3," Accordingly, the subsequent operation information NINF1 may be for logical addresses LA from "3" to "5."

The write-same manager 111 may determine that the preceding operation information WINF and the subsequent operation information NINF1 include the same pattern PT1. Furthermore, the write-same manager 111 may determine that all the logical addresses LA from "1" to "5" in both the preceding operation information WINF and the subsequent operation information NINF1 are continuous.

Accordingly, the write-same manager 111 may determine to merge the preceding write-same operation and the subsequent write-same operation, and may update the preceding operation information WINF. The updated pending operation information UINF1 may include the same pattern PT1, may include the foremost logical address LA "1" among logical addresses, into which all the logical addresses in both the preceding operation information WINF and the subsequent operation information NINF1 are merged, as a start logical address SLA, and may include the count "5" of the merged logical addresses as a count CNT.

Referring to FIG. 4B, the write-same manager 111 may store the subsequent operation information NINF2 for a subsequent write-same operation in the operation information memory INFM in response to a write-same command in the state in which preceding operation information WINF has been stored in the operation information memory INFM. The write-same manager 111 may determine whether to merge the subsequent write-same operation with a preceding write-same operation, by comparing the subsequent operation information NINF2 and the preceding operation information WINF.

Specifically, the subsequent operation information NINF2 may include a pattern PT1, a start logical address SLA "2" and a count CNT "3." Accordingly, the subsequent operation information NINF2 may be for logical addresses LA from "2" to "4."

The write-same manager 111 may determine that the preceding operation information WINF and the subsequent operation information NINF2 include the same pattern PT1. Furthermore, the write-same manager 111 may determine that all logical addresses LA from "1" to "4" in both the preceding operation information WINF and the subsequent operation information NINF2 are continuous. That is, the write-same manager 111 may determine that the merged logical addresses are continuous although at least some of the logical addresses LA of the preceding operation information WINF and the logical addresses LA of the subsequent operation information NINF2 overlap.

Accordingly, the write-same manager 111 may determine to merge the preceding write-same operation and the subsequent write-same operation, and may update the preceding operation information WINF. The updated pending operation information UINF2 may include the same pattern PT1, may include the foremost logical address LA "1" among logical addresses, into which all the logical addresses in both the preceding operation information WINF and the subsequent operation information NINF2 are merged, as a start logical address SLA, and may include the count "4" of the merged logical addresses as a count CNT.

Referring to FIG. 4C, the write-same manager 111 may store the subsequent operation information NINF3 for a subsequent write-same operation in the operation information memory INFM in response to a write-same command in the state in which preceding operation information WINF has been stored in the operation information memory INFM. The write-same manager 111 may determine whether to merge the subsequent write-same operation with a preceding write-same operation, by comparing the subsequent operation information NINF3 and the preceding operation information WINF.

Specifically, the subsequent operation information NINF3 may include a pattern PT1, a start logical address SLA "0" and a count CNT "3." Accordingly, the subsequent operation information NINF3 may be for logical addresses LA from "0" to "2."

The write-same manager 111 may determine that the preceding operation information WINF and the subsequent operation information NINF3 include the same pattern PT1. Furthermore, the write-same manager 111 may determine that all logical addresses LA from "0" to "2" in both the preceding operation information WINF and the subsequent operation information NINF3 are continuous.

Accordingly, the write-same manager 111 may determine to merge the preceding write-same operation and the subsequent write-same operation, and may update the preceding operation information WINF. The updated pending operation information UINF3 may include the same pattern PT1, may include the foremost logical address LA "0" among logical addresses, into which all the logical addresses in both the preceding operation information WINF and the subsequent operation information NINF3 are merged, as a start logical address SLA, and may include the count "3" of the merged logical addresses as a count CNT.

Figure 5A:
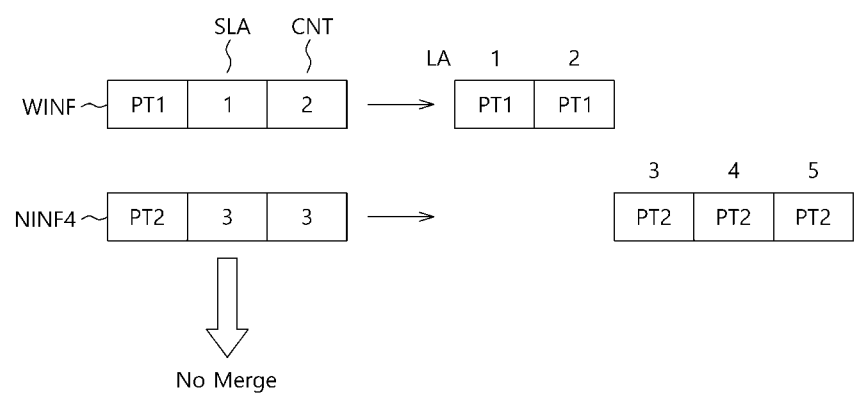
FIGS. 5A and 5B are diagrams illustrating cases where the write-same manager cannot merge write-same operations according to an embodiment of the present disclosure.
Figure 5B:
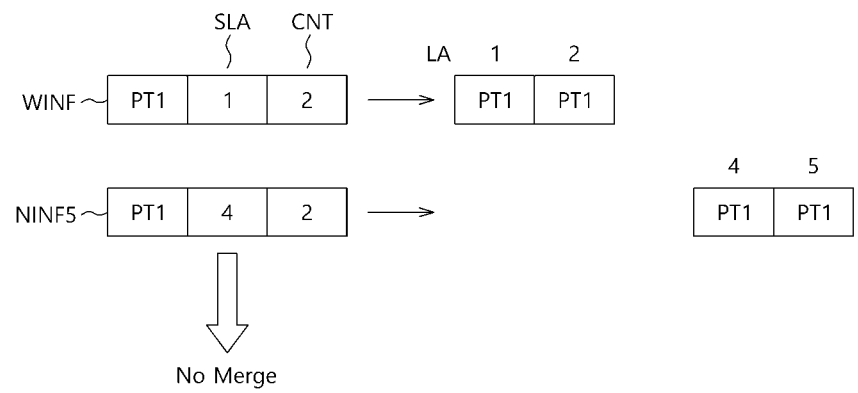

FIGS. 5A and 5B are diagrams illustrating cases where the write-same manager 111 cannot merge write-same operations according to an embodiment.

Referring to FIG. 5A, the write-same manager 111 may store subsequent operation information NINF4 for a subsequent write-same operation in the operation information memory INFM in the state in which preceding operation information WINF has been stored in the operation information memory INFM. The write-same manager 111 may determine whether to merge the subsequent write-same operation with a preceding write-same operation, by comparing the subsequent operation information NINF4 and the preceding operation information WINF.

Specifically, the subsequent operation information NINF4 may include a pattern PT2, a start logical address SLA "3" and a count CNT "3." Accordingly, the subsequent operation information NINF4 may be for logical addresses LA from "3" to "5."

The write-same manager 111 may determine that the preceding operation information WINF and the subsequent operation information NINF4 include different patterns PT1 and PT2. Accordingly, although all logical addresses LA in both the preceding operation information WINF and the subsequent operation information NINF4 are continuous, the write-same manager 111 may determine not to merge the preceding write-same operation and the subsequent write-same operation. In this case, the preceding operation information WINF and the subsequent operation information NINF4 may be maintained in the operation information memory INFM without any change.

Referring to FIG. 5B, the write-same manager 111 may store subsequent operation information NINF5 for a subsequent write-same operation in the operation information memory INFM in the state in which preceding operation information WINF has been stored in the operation information memory INFM. The write-same manager 111 may determine whether to merge the subsequent write-same operation with a preceding write-same operation, by comparing the subsequent operation information NINF5 and the preceding operation information WINF.

Specifically, the subsequent operation information NINF5 may include a pattern PT1, a start logical address SLA "4" and a count CNT "2." Accordingly, the subsequent operation information NINF5 may be for logical addresses LA "4" and "5."

The write-same manager 111 may determine that the preceding operation information WINF and the subsequent operation information NINF5 include the same pattern PT1. Furthermore, the write-same manager 111 may determine that all logical addresses LA in both the preceding operation information WINF and the subsequent operation information NINF5 are not continuous.

Accordingly, the write-same manager 111 may determine not to merge the preceding write-same operation and the subsequent write-same operation. In this case, the preceding operation information WINF and the subsequent operation information NINF5 may be maintained in the operation information memory INFM without any change.

In some embodiments, the preceding operation information WINF in FIGS. 4A to 4C and 5A and 5B may not be limited to information most recently stored in the operation information memory INFM. That is, if a plurality of write-same operations are pending, the write-same manager 111 may determine whether to merge a subsequent write-same operation with each of the preceding write-same operations.

Figure 6:
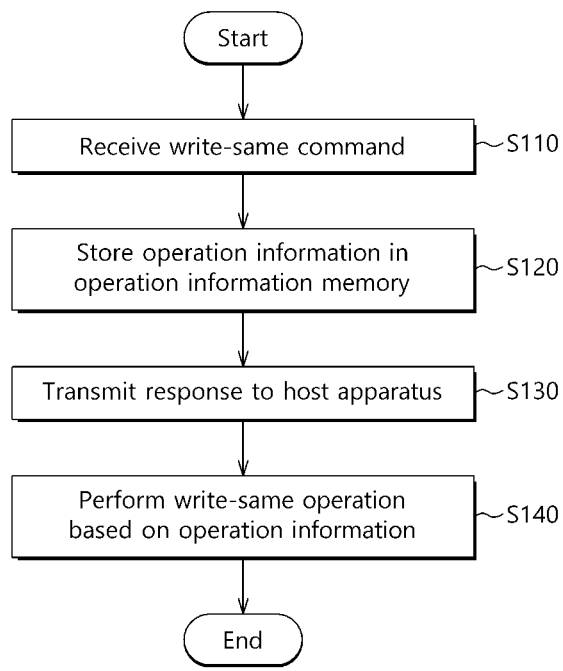
FIG. 6 is a flowchart illustrating a method of performing, by the write-same manager, a write-same operation according to an embodiment of the present disclosure.

FIG. 6 is a flowchart illustrating a method of performing, by the write-same manager 111, a write-same operation according to an embodiment of the present disclosure.

Referring to FIG. 6, at operation S110, the write-same manager 111 may receive a write-same command from the host apparatus.

At operation S120, the write-same manager 111 may store subsequent operation information in the operation information memory INFM in response to the write-same command.

At operation S130, the write-same manager 111 may transmit, to the host apparatus, a response to the write-same command although a subsequent write-same operation has not been completed.

At operation S140, the write-same manager 111 may perform a write-same operation on the nonvolatile memory apparatus 120 based on the operation information stored in the operation information memory INFM. Specifically, the write-same manager 111 may control the encryption unit 112 to generate encrypted data based on patterns and continuous logical addresses. Furthermore, the write-same manager 111 may control the write unit 113 to store the encrypted data in the nonvolatile memory apparatus 120.

Figure 7:
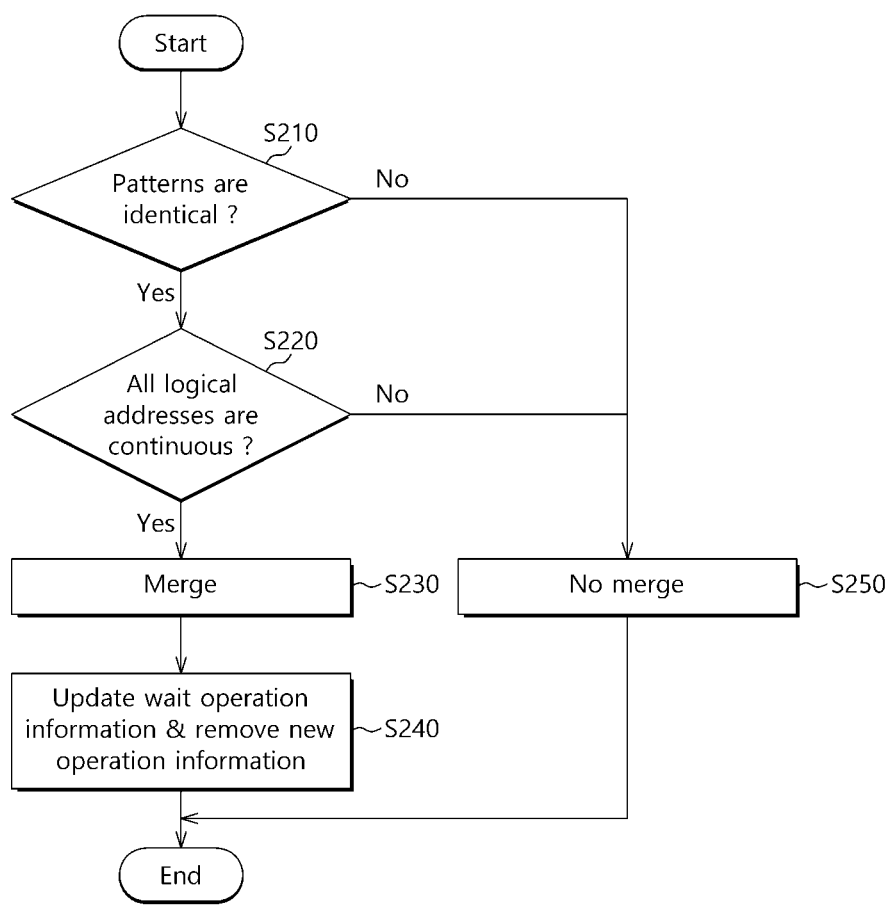
FIG. 7 is a flowchart illustrating a method of merging, by the write-same manager, write-same operations according to an embodiment of the present disclosure.

FIG. 7 is a flowchart illustrating a method of merging, by the write-same manager 111, write-same operations according to an embodiment of the present disclosure.

Referring to FIG. 7, at operation S210, the write-same manager 111 may determine whether the pattern data of preceding operation information and the pattern data of subsequent operation information are identical. When a pattern is generated from pattern data and then stored as operation information, the write-same manager 111 may determine whether pattern data of preceding operation information and pattern data of subsequent operation information are identical. When the pattern data of the preceding operation information and the pattern data of the subsequent operation information are different, the procedure may proceed to operation S250. When the pattern data of the preceding operation information and the pattern data of the subsequent operation information are identical, the procedure may proceed to operation S220.

At operation S220, the write-same manager 111 may determine whether all logical addresses in both the preceding operation information and the subsequent operation information are continuous. When all the logical addresses are not continuous, the procedure may proceed to operation S250. When all the logical addresses are continuous, the procedure may proceed to operation S230.

At operation S230, the write-same manager 111 may determine to merge a subsequent write-same operation with a preceding write-same operation.

At operation S240, the write-same manager 111 may update the preceding operation information and remove the subsequent operation information.

At operation S250, the write-same manager 111 may determine not to merge the subsequent write-same operation with the preceding write-same operation.

The memory system and the operating method thereof according to embodiments of the present disclosure can efficiently perform a write-same operation.

Figure 8:
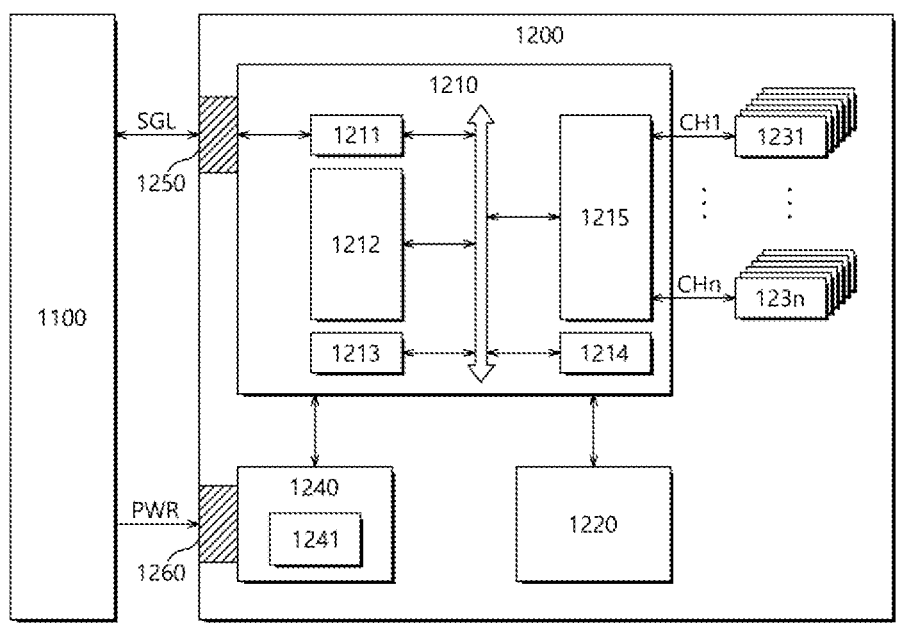
FIG. 8 is a diagram illustrating a data processing system including a solid state drive (SSD) in accordance with an embodiment of the present disclosure.

FIG. 8 is a diagram illustrating a data processing system 1000 including a solid state drive (SSD) 1200 in accordance with an embodiment of the present disclosure. Referring to FIG. 8, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnect (PCI), PCI express (PCI-E) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software. The control unit 1212 may include the write-same manager 111, the encryption unit 112, and the write unit 113 shown in FIG. 1.

The ECC unit 1214 may generate the parity data of data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory interface unit 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 9:
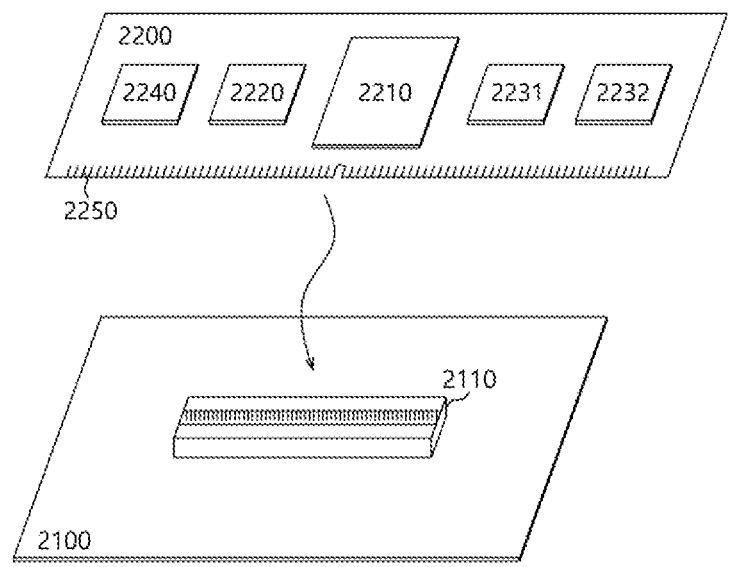
FIG. 9 is a diagram illustrating a data processing system including a memory system in accordance with an embodiment of the present disclosure.

FIG. 9 is a diagram illustrating a data processing system 2000 including a memory system 2200 in accordance with an embodiment of the present disclosure. Referring to FIG. 9, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 8.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and power may be transferred between the host device 2100 and the memory system 2200. The connection terminal 2250 may be configured as various types depending on an interface scheme between the host device 2100 and the memory system 2200. The connection terminal 2250 may be disposed on any one side of the memory system 2200.

Figure 10:
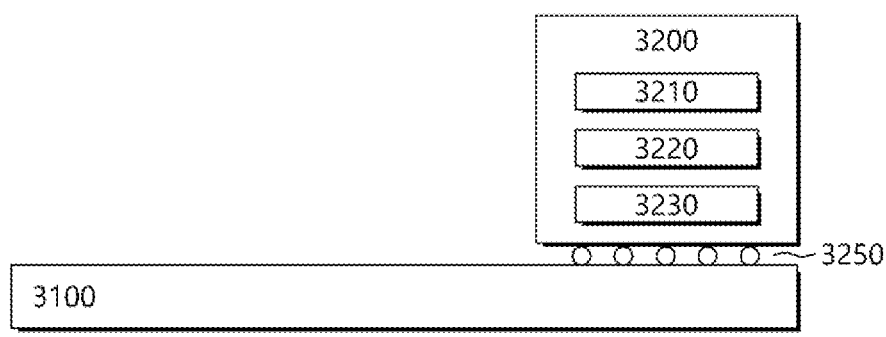
FIG. 10 is a diagram illustrating a data processing system including a memory system in accordance with an embodiment of the present disclosure.

FIG. 10 is a diagram illustrating a data processing system 3000 including a memory system 3200 in accordance with an embodiment of the present disclosure. Referring to FIG. 10, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 8.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 11:
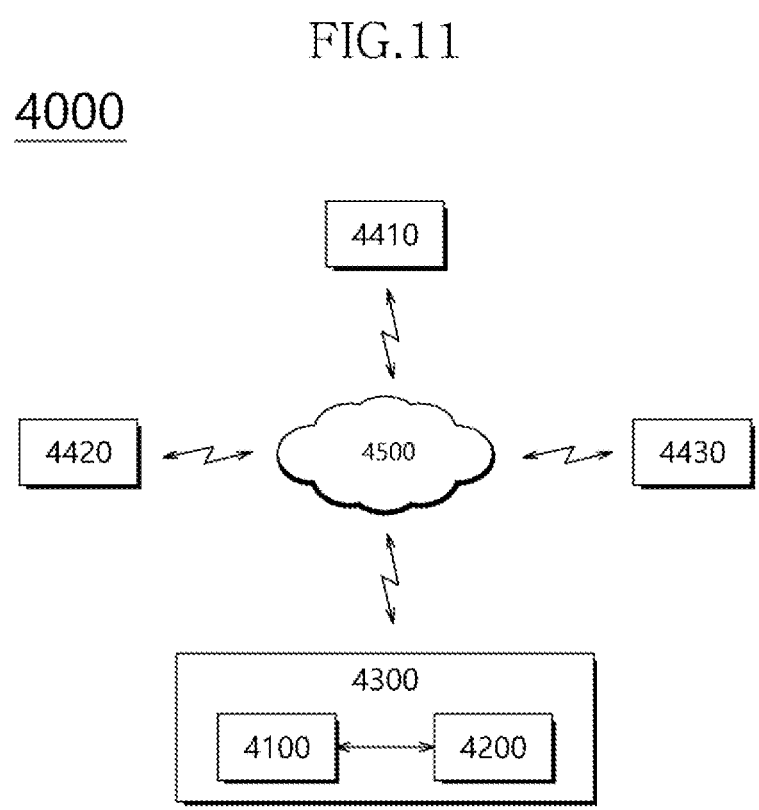
FIG. 11 is a diagram illustrating a network system including a memory system in accordance with an embodiment of the present disclosure.

FIG. 11 is a diagram illustrating a network system 4000 including a memory system 4200 in accordance with an embodiment of the present disclosure. Referring to FIG. 11, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 10 shown in FIG. 1, the memory system 1200 shown in FIG. 8, the memory system 2200 shown in FIG. 9 or the memory system 3200 shown in FIG. 10.

Figure 12:
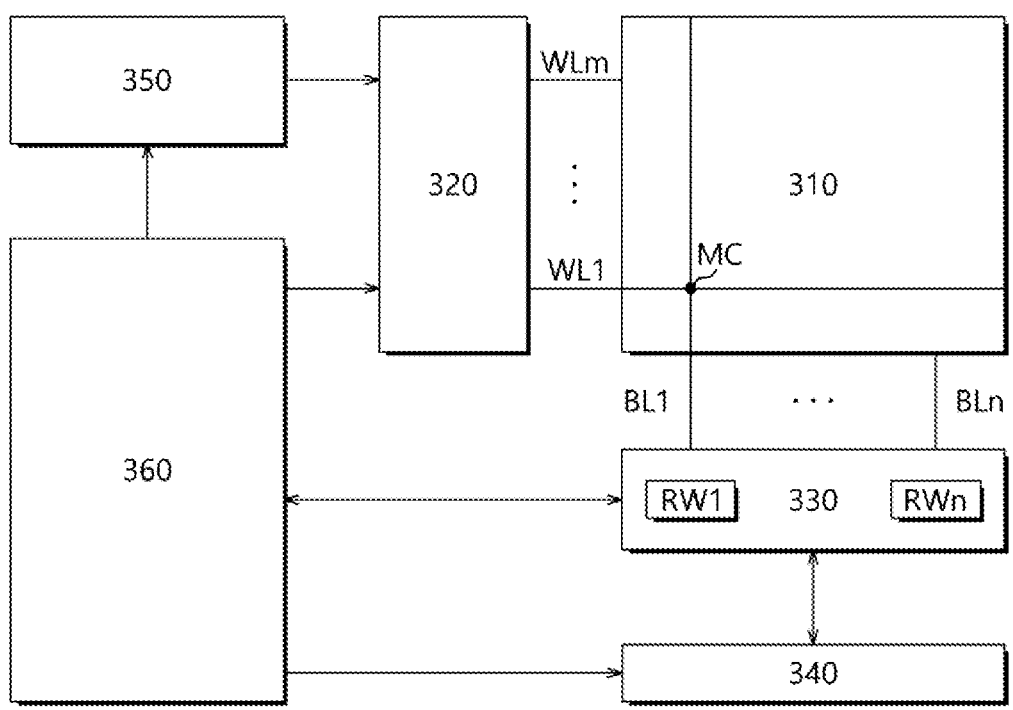
FIG. 12 is a block diagram illustrating a nonvolatile memory device included in a memory system in accordance with an embodiment of the present disclosure.

FIG. 12 is a block diagram illustrating a nonvolatile memory device 300 included in a memory system in accordance with an embodiment of the present disclosure. Referring to FIG. 12, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

Those skilled in the art to which this disclosure pertains should understand that the embodiments described above are only illustrative from all aspects, not limitative, because this disclosure may be implemented in various other forms without departing from the technical spirit or characteristics of this disclosure. Accordingly, the scope of this disclosure is defined by the appended claims described below rather than by the detailed description, and all modifications or variations derived from the meanings and scope of the claims and equivalents thereof should be construed as being included in the scope of this disclosure.

What is claimed is:

1. A memory system comprising:
   a nonvolatile memory apparatus; and
   a write-same manager configured to perform a write-same operation on the nonvolatile memory apparatus,
   wherein the write-same manager is configured to:
   store operation information in an operation information memory in response to a write-same command transmitted by a host apparatus, and
   transmit, to the host apparatus, a response to the write-same command although a write-same operation corresponding to the operation information is not yet completed.

2. The memory system of claim 1,
   wherein the write-same manager is configured to merge a first write-same operation and a second write-same operation when pattern data of first operation information of the first write-same operation and pattern data of second operation information of the second write-same operation are identical and all logical addresses in both the first operation information and the second operation information are continuous.

3. The memory system of claim 2, wherein:
   the write-same manager is configured to generate updated operation information in order to merge the first write-same operation and the second write-same operation, and
   wherein the updated operation information comprises the pattern data, a foremost logical address among logical addresses, into which all the logical addresses in both the first operation information and the second operation information are merged, and a count of the merged logical addresses.

4. The memory system of claim 3, wherein:
   the write-same manager comprises an operation information memory configured to store the first operation information and the second operation information, and
   wherein the write-same manager is configured to update preceding information of the first operation information and the second operation information as the updated operation information and to remove subsequent information of the first operation information and the second operation information.

5. The memory system of claim 2, wherein the write-same manager is configured to determine not to merge the first write-same operation and the second write-same operation when the pattern data of the first operation information and the pattern data of the second operation information are not identical or the all logical addresses in both the first operation information and the second operation information are not continuous.

6. The memory system of claim 1, further comprising an encryption circuit configured to encrypt repetitive patterns respectively corresponding to continuous logical addresses into encrypted patterns at a time when the write-same operation is performed.

7. The memory system of claim 6,
   further comprising a write unit configured to store the encrypted patterns in the nonvolatile memory apparatus when the write-same operation is performed,
   wherein the write-same manager is configured to control the encryption circuit unit to encrypt subsequent patterns while the write unit is storing the encrypted patterns in the nonvolatile memory apparatus.

8. An operating method for a memory system, comprising:
   comparing first operation information of a first write-same operation and second operation information of a second write-same operation; and
   determining whether to merge the first write-same operation and the second write-same operation based on a result of the comparison,
   wherein the comparing of the first operation information and the second operation information comprises determining whether pattern data of the first operation information and pattern data of the second operation information are identical and all logical addresses in both the first operation information and the second operation information are continuous.

9. The operating method of claim 8,
   further comprising generating updated operation information in order to merge the first write-same operation and the second write-same operation,
   wherein the updated operation information comprises the pattern data, a foremost logical address among logical addresses, into which all the logical addresses in both the first operation information and the second operation information are merged, and a count of the merged logical addresses.

10. The operating method of claim 9, wherein the generating of the updated operation information comprises:
    updating preceding information of the first operation information and the second operation information as the updated operation information, and
    removing subsequent information of the first operation information and the second operation information.

11. The operating method of claim 8,
    further comprising performing a merged write-same operation when the first write-same operation and the second write-same operation are determined to be merged,
    wherein the performing of the merged write-same operation comprises:
    encrypting repetitive patterns respectively corresponding to the merged logical addresses into encrypted patterns at a time, and
    storing the encrypted patterns in a nonvolatile memory apparatus,
    wherein subsequent patterns are encrypted while the encrypted patterns are being stored in the nonvolatile memory apparatus.

12. The operating method of claim 8, further comprising:
storing operation information in an operation information memory in response to a write-same command transmitted by a host apparatus; and
transmitting, to the host apparatus, a response to the write-same command although a write-same operation corresponding to the operation information is not yet completed.

13. A memory system comprising:
a nonvolatile memory apparatus;
a write-same manager configured to perform a write-same operation on the nonvolatile memory apparatus; and
an encryption circuit configured to encrypt repetitive patterns respectively corresponding to continuous logical addresses into encrypted patterns at a time when the write-same operation is performed,
wherein the write-same manager is configured to merge two or more write-same operations when pattern data of the two or more write-same operations are identical and all logical addresses corresponding to the two or more write-same operations are continuous.

14. The memory system of claim 13, wherein:
the write-same manager is configured to generate operation information of the merged write-same operation, and
the operation information comprises the pattern data, a foremost one among logical addresses, into which all the logical addresses corresponding to two or more write-same operations are merged, and a count of the merged logical addresses.

15. The memory system of claim 13,
further comprising a write unit configured to store the encrypted patterns in the nonvolatile memory apparatus when the write-same operation is performed,
wherein the write-same manager is configured to control the encryption circuit to encrypt subsequent patterns while the write unit is storing the encrypted patterns in the nonvolatile memory apparatus.

16. The memory system of claim 13, wherein the write-same manager is configured to:
store operation information in an operation information memory in response to a write-same command transmitted by a host apparatus, and
transmit, to the host apparatus, a response to the write-same command although a write-same operation corresponding to the operation information is not yet completed.

\* \* \* \* \*